United States Patent
Albea Sanchez et al.

(10) Patent No.: US 9,523,996 B2
(45) Date of Patent: Dec. 20, 2016

(54) OPTIMIZED VOLTAGE-FREQUENCY CONTROL

(71) Applicant: COMMISSARIAT A L'ENERGIE ATOMIQUE ET AUX ENERGIES ALTERNATIVES, Paris (FR)

(72) Inventors: Carolina Albea Sanchez, Froges (FR); Suzanne Lesecq, Froges (FR); Diego Puschini Pascual, Meylan (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 225 days.

(21) Appl. No.: 14/366,475

(22) PCT Filed: Dec. 20, 2012

(86) PCT No.: PCT/FR2012/053029
§ 371 (c)(1),
(2) Date: Jun. 18, 2014

(87) PCT Pub. No.: WO2013/093362
PCT Pub. Date: Jun. 27, 2013

(65) Prior Publication Data
US 2014/0321165 A1    Oct. 30, 2014

(30) Foreign Application Priority Data
Dec. 21, 2011  (FR) .................................... 11 62200

(51) Int. Cl.
| G06F 1/32 | (2006.01) |
| G05F 5/00 | (2006.01) |
| G06F 1/26 | (2006.01) |

(52) U.S. Cl.
CPC .............. *G05F 5/00* (2013.01); *G06F 1/324* (2013.01); *G06F 1/3206* (2013.01); *G06F 1/3296* (2013.01); *G06F 1/26* (2013.01); *Y02B 60/1217* (2013.01); *Y02B 60/1285* (2013.01)

(58) Field of Classification Search
CPC .............. G06F 1/12; G06F 1/00; G05F 1/22
USPC .......................................................... 713/300
See application file for complete search history.

(56) References Cited

U.S. PATENT DOCUMENTS

| 7,581,120 B1 | 8/2009 | Hartman et al. |
| 2002/0002689 A1 | 1/2002 | Yeh |
| 2004/0057324 A1* | 3/2004 | Abe ...................... G11O 5/147 365/232 |

(Continued)

OTHER PUBLICATIONS

Khalil, Hassan "Nonlinear Systems", $3^{nd}$ Edition, Chapter 3, Prentice Hall, 2002, pp. 87-110.

(Continued)

*Primary Examiner* — Thomas Lee
*Assistant Examiner* — Volvick Derose
(74) *Attorney, Agent, or Firm* — Brinks Gilson & Lione

(57) ABSTRACT

A method for controlling an electronic circuit, characterised in that it comprises a step of feedback control of a current voltage-frequency operating point relative to a reference curve of a voltage-frequency domain of operation associated with the circuit, to bring the circuit from a first operating point to a second operating point, said reference curve linking said first and second operating points in an optimal trajectory relative to a boundary of said domain.

16 Claims, 8 Drawing Sheets

(56) References Cited

U.S. PATENT DOCUMENTS

| | | | |
|---|---|---|---|
| 2007/0168055 A1* | 7/2007 | Hsu | G06F 1/3203 700/32 |
| 2007/0229054 A1 | 10/2007 | Dobberpuhl et al. | |
| 2008/0177686 A1* | 7/2008 | Buyuktosunoglu | G05B 13/048 706/46 |
| 2008/0307240 A1* | 12/2008 | Dahan | G06F 1/06 713/320 |
| 2009/0158078 A1 | 6/2009 | Knoth | |
| 2010/0213919 A1 | 8/2010 | Takayanagi et al. | |
| 2011/0083021 A1* | 4/2011 | Floyd | G06F 1/3203 713/300 |
| 2011/0083221 A1 | 4/2011 | Ivers | |
| 2011/0154069 A1* | 6/2011 | Costales | G06F 1/3203 713/300 |
| 2014/0191734 A1* | 7/2014 | Kuang | G06F 1/3206 323/234 |

OTHER PUBLICATIONS

International Search Report from WIPO Publication No. WO 2013/093362 A1 dated Feb. 25, 2013, 6 pages.

Albea, Carolina et al. "Control and Stability Analysis for the Vdd-hopping Mechanism", IEEE MSC, Conference on Control and Applications, Russian Federation, 2009,, 6 pages.

Beigne, Edith et al., "An Innovative Local Adaptive Voltage Scaling Architecture for On-chip Variability Compensation", NEWCAS 2011, Jun. 26-29, 2011, Bordeaux, France, 4 pages.

Choi, Kihwan et al., "Fine-Grained Dynamic Voltage and Frequency Scaling for Precise Energy and Performance Trade-off based on the Ratio of Off-chip Access to On-chip Computation Times", IEEE Trans. On Computer Aided Design of Integrated Circuits and Systems, vol. 24, 1:18-28, 2005, 10 pages.

Herbert, Sebastian et al., "Variation-Aware Dynamic Voltage/Frequency Scaling", IEEE 15$^{th}$ International Symposium on High Performance Computer Architecture (HPCA), 301-312, 2009, 12 pages.

Juang, Philo et al., "Coordinated, Distributed, Formal Energy Management of Chip Multiprocessors", ISLPED 2005, Aug. 8-10, 2005, San Diego, California, 4 pages.

Khalil, Hassan "Nonlinear Systems", 2$^{nd}$ Edition, Chapter 3, Prentice Hall, 2002, 70 pages.

Lesecq Suzanne et al. "Low-Cost and Robust Control of a DFLL for Multi-Processor System-On-Chip", 18$^{th}$ IFAC World Congress, Aug. 28-Sep. 2, 2011, 6 pages.

Lu, Zhijian, et al., "Control-Theoretic Dynamic Frequency and Voltage Scaling for Multimedia Workloads", Procedure of the International Conference on Compilers, Architecture, and Synthesis for Embedded Systems, 156-163, 2002, 8 pages.

Rebaud, B. et al., "Timing Slack Monitoring Under Process and Environmental Variations: Application to a DSP Performance Optimization", Microelectronics Journal, 2011, 15 pages.

Wu, Qiang et al., "Formal Online Methods for Voltage/Frequency Control in Multiple Clock Domain Microprocessors", ACM SIGARCH Computer Architecture News, vol. 32, 5:248-259, 2004, 12 pages.

Zhu, Yifan et al., "Feedback EDF Scheduling Exploiting Hardware-Assisted Asynchronous Dynamic Voltage Scaling", ACM SIGPLAN Notices, vol. 40, 7:212-222, 2005, 10 pages.

* cited by examiner

OPTIMIZED VOLTAGE-FREQUENCY CONTROL

This application is a U.S. nationalization of PCT application No. PCT/FR2012/053029, filed Dec. 12, 2012, published as PCT publication No. WO 2013/093362 on Jun. 27, 2013, which claims priority to French patent application No. 116220, filed Dec. 21, 2011, the disclosures of which are incorporated by reference.

TECHNICAL FIELD

The present invention concerns voltage and frequency control of electronic circuits (digital or mixed analog-digital) in their operating domain. This control applies for example to SoCs (SoC being an acronym for "System-on-Chip"). It may also apply to GALS architectures (GALS being an acronym for "Globally Asynchronous Locally Synchronous").

BACKGROUND

Typically, an electronic circuit or part of an electronic circuit (commonly called a VFI for "Voltage Frequency Island"), both designated by "circuit" below, are controlled so as to apply to them at each instant a voltage and a frequency within their operating domain and so as to limit the energy consumption while meeting performance constraints (number of operations per unit time). For this purpose, the controlled electronic circuit is associated with a "voltage actuator" and with a "frequency actuator" enabling the chosen voltage and frequency to be applied. These two actuators may themselves be controlled by an internal feedback control loop.

A voltage-frequency pair in the operating domain is commonly called an operating point.

In practice, it should be ensured that for the applied voltage, the applied frequency is not too high in order not to give rise to "timing faults".

Numerous bibliographical references and patents set out what are referred to as "DVFS" approaches (DVFS standing for "Dynamic Voltage Frequency Scaling") to control the voltage and the frequency.

In Published U.S. Pat. Application No. 2011/0083221 the voltage is increased in a first phase then a frequency change request is made in a second phase. The value of the voltage has a direct link with the value of the changed frequency. A sequence of voltage changes and a sequence of frequency changes may be applied. A voltage change indicator indicates the end of the preceding step. The transition to pass from a high voltage value to a low voltage value (and vice-versa) and/or from a high frequency value to a low frequency value (and vice-versa) is not controlled.

In the paper by Zhu et al. "Feedback EDF scheduling exploiting hardware-assisted asynchronous dynamic voltage scaling" ACM SIGPLAN Notices, vol 40:7, pp. 212-222, 2005, the voltage is increased then subsequently the frequency. The case of the reduction in these parameters is not dealt with. At the time of modifying the voltage-frequency operating point (V, F), the voltage increases as a ramp function. The time necessary to attain the minimum voltage required for the application of the new desired frequency without any timing fault is then estimated. When this time has passed, the new frequency is applied. Frequency and voltage are thus controlled sequentially.

In the paper by Wu et al. "*Formal online methods for voltage/frequency control in multiple clock domain microprocessors*" ACM SIGARCH Computer Architecture News, vol 32:5, pp. 248-259, 2004, DVFS is dealt with in terms of a problem of adjusting the frequency to adapt to the variations in load. A "perfect" DVFS scheme enables the desired performance to be obtained, without needless consumption. A queue type model is used to model the frequency domain. The model used is non-linear: it is first of all linearized then a linear control law is implemented via hardware. This document specifies that the frequency and the associated voltage cannot be modified instantaneously. For the control, a control interval itself constituted by N sampling periods is used. The frequency is deduced based on the computation of the execution capability itself output from a standard digital PI (Proportional-Integral) controller. In practice, it is not the frequency dynamic that is controlled, but the execution capability dynamic. Lastly, no information is given as to the way to modify the voltage relative to the frequency or as to the transition between two operating points.

The document by Juang et al. "Distributed, Formal Energy Management of *Chip Multiprocessors*" ISLPED'05, 8-10 Août, 2005, San Diego, Calif., USA extends the approach in the document by Wu et al. to the case of a multi-processor system. A distributed control approach is implemented. Here too, no information as to the frequency and voltage transitions is given, nor as to the coupling of these parameters.

The paper by Choi et al., "Fine-grained dynamic voltage and frequency *scaling for precise energy and performance tradeoff based on the ratio of off-chip access to on-chip computation times*" IEEE Trans. on Computer-Aided Design of Integrated Circuits and Systems, vol 24:1, 18-28, 2005, also presents a DVFS but without dealing with the question of the transition from one operating point to another.

In the paper by Lu et al., "*Control-theoretic dynamic frequency and voltage scaling for multimedia workloads*" Proc. of the international conference on compilers, architecture, and synthesis for embedded systems, pp. 156-163, 2002, concerning a multimedia application, the voltage V and the frequency F of a processor are adapted according to the frame throughput. In fact, control theory is used to adapt the frequency F while providing for the desired throughput (and thus the desired delay). In practice, a "frequency factor" comprised between 0 and 1, is adapted but the control is made on the average delay. No information is given as to the dynamic of the frequency transitions. It is only indicated that the frequency transition (induced by modifying the frequency factor) is short compared with the decoding time for a frame. Nothing is indicated as to the modifications to voltage nor as to the way in which voltage and frequency should be managed to avoid timing faults.

The paper by Herbert et al., "*Variation-aware dynamic voltage/frequency scaling*" IEEE 15th International Symposium on High Performance Computer Architecture (HPCA), 301-312, 2009 deals with DVFS (Dynamic Voltage and Frequency Scaling) but it does not refer to the transition problems which arise at the time of voltage and frequency modifications.

The inventors have found that in the prior art, the transition of a passage from one operating point to another was not optimally controlled.

In particular, the inventors have found that DVFS systems pass from one operating point to another sequentially by separately modifying voltage and frequency in order to avoid timing faults.

This sequential passage is illustrated by FIG. 1.

FIG. 1 illustrates a voltage-frequency operating domain by two orthogonal axes with the voltage V along the x-axis and the frequency along the y-axis. The operational (or operating) region (or domain) of the circuit considered is delimited by the x-axis (given that the frequency is a positive quantity), a vertical first boundary (Boundary 1) representing the maximum voltage the voltage-frequency operating domain considered of the circuit can bear and a second boundary (Boundary 2) representing for each voltage value allowable by the circuit, the maximum authorized frequency (to avoid timing faults).

FIG. 1 illustrates the passage from a first operating point (V1, F1) to a second operating point (V2, F2). According to the prior art, this passage is made in two phases passing via an intermediate operating point (V2, F1). This passage in two phases avoids going out of the operational region.

Nevertheless, during the course of the transition (i.e. the passage from point (V1, F1) to point (V2, F2)), the dynamic consumption of the circuit is not optimum.

To be precise, the dynamic power Pdyn is proportional to the frequency F and has a quadratic relationship with voltage V ($Pdyn \propto FV^2$). However, throughout the transition schematized by arrows T1 and T2, the frequency could be higher. Admittedly, more power would be consumed but the performance of the circuit would be improved (in terms of the number of operations per unit time).

The inventors have thus exposed a need to improve the voltage-frequency control of electronic circuits.

SUMMARY

A first aspect of the invention concerns a method of controlling an electronic circuit, characterized in that it comprises a step of feedback control of a current voltage-frequency operating point relative to a reference curve of a voltage-frequency operating domain associated with the circuit, to bring the circuit from a first operating point to a second operating point, said reference curve linking said first and second operating points with an optimum path relative to a boundary of said domain.

According to the present invention, the term "circuit" may be understood as a circuit in its entirety or part of a circuit (for example a "Voltage Frequency Island", VFI).

The change in the supply voltage and the frequency is controlled throughout the change in operating point (V, F) by remaining as close as possible to a reference curve in the operating domain that enables a maximum performance to be ensured for the transitional operating point considered (between the first and second points) without any timing fault.

It is thus possible to control changes in the voltage and frequency so as to obtain an operational circuit throughout the transition phase between two operating points while being situated on the optimum performance/consumption point (that is to say optimum performance for a minimum associated consumption).

For example, the control is conjoint. Furthermore for example, the controlled circuit has a DVFS architecture.

According to embodiments it is possible to control the circuit such that it autonomously follows an optimum path in the V-F plane.

It is possible to maintain the controlled circuit in an optimum state in terms of maximum performance at the transition point considered and of minimum consumption at that point.

To implement the feedback control, a coupling of generic voltage and frequency "actuators" may be implemented.

According to an example definition of the reference curve, for a given voltage of the operating domain, the reference curve maximizes the frequency within said domain.

Thus, an "optimum path" makes it possible at each point to maximize the performance (in terms of the number of operations per unit time) of the transitional operating point without violating the boundaries of the operating domain.

The method may furthermore comprise the following steps of:
measuring a current value of voltage applied to the circuit,
measuring a current value of frequency applied to the circuit,
determining a reference voltage value corresponding to said current value of frequency on said reference curve, and
updating the voltage applied to the circuit based on the determined reference voltage value.

Alternatively or in combination, the method may furthermore comprise the following steps of:
measuring a current value of voltage applied to the circuit,
measuring a current value of frequency applied to the circuit,
determining a reference frequency value corresponding to said current value of voltage on said reference curve, and
updating the frequency applied to the circuit based on the determined reference frequency value.

Thus, the circuit is controlled so as to simultaneously take into account the current voltage and frequency.

The updating of the voltage and frequency that are applied to the circuit is for example executed conjointly (or simultaneously).

This conjoint updating is for example implemented when the circuit implementing the control acts both on a voltage actuator and on a frequency actuator.

The method may furthermore comprise a step of limiting at least one of the variations in the voltage and in the frequency that are applied to the circuit to prevent bringing the current operating point outside the voltage-frequency operating domain associated with the circuit.

Alternatively or in combination, the method may furthermore comprise a step of correcting at least one of the variations in the voltage and in the frequency that are applied to the circuit to prevent bringing the current operating point outside the voltage-frequency operating domain associated with the circuit.

For example, said correction is a Proportional-Integral-Derivative type correction.

The method may furthermore comprise a step of scaling the signals for measuring voltage and frequency in order to compensate for a difference in response time to the feedback control step.

For example, the scaling comprises downsampling of at least one of the signals for measuring voltage and frequency.

The method may furthermore comprise a step of final adjustment of the operating point of the circuit to bring the second operating point towards a final operating point.

Thus, it is possible to optimize the operating point of arrival to the maximum extent by taking it as close as possible to the boundary.

For example, the final adjustment step comprises an adjustment of the frequency of the circuit to bring the operating point of the circuit closer to said boundary.

Alternatively or in combination, the method may furthermore comprise a step of initial adjustment of the operating point of the circuit to bring an initial operating point towards the first operating point.

Thus, it is possible for example to take the operating point further away from the boundary before performing the feedback control. This may make it possible to perform the feedback control more safely with respect to the boundary by limiting the risk of exceedance. The initial adjustment may also make it possible to be located on a desired reference curve.

For example, the initial adjustment step comprises an adjustment of the voltage of the circuit to bring the operating point of the circuit away from said boundary.

The method may furthermore comprise a step of uncoupling the application of the frequency from the application of the voltage to the circuit prior to said adjustment steps.

Thus, it is possible to perform the adjustments independently, without any constraint of coupled change.

The method may furthermore comprise a step of selecting said reference curve from among a set of stored reference curves on the basis of at least one operating parameter of the circuit.

Thus, it is possible to choose the reference curve relative to which the feedback control is performed according to various parameters.

The method may furthermore comprise a calibrating step to define said reference curve.

The method may furthermore comprise a calibrating step to modify said reference curve.

Thus, it is possible to adapt the feedback control on the basis of the current operating conditions of the controlled circuit.

For example, the modification is carried out in real time.

For example, the method further comprises a step of storing said curve.

The calibrating step may for example be triggered on the basis of at least one operating parameter of the circuit such as:
 the temperature of the circuit,
 a timing fault rate of the circuit,
 ageing of the circuit,
 etc.

The circuit may for example have a globally asynchronous locally synchronous architecture.

A second aspect of the invention concerns a computer program as well as a computer program product and a storage medium for such program and product, enabling the implementation of a method according to the first aspect, when the program is stored in a memory of a control device of an electronic circuit and executed by a processor of such a device.

Such a computer program may for example be implemented by a computer implanted in a circuit.

A third aspect of the invention concerns an electronic circuit control device comprising a processing unit configured for implementing a method according to the first aspect.

A fourth aspect of the invention concerns an electronic control circuit configured for implementing a method according to the first aspect. For example, such a circuit is controlled (or commanded) by a device according to the third aspect.

For example, the circuit is an integrated circuit.

The circuit may comprise a control module for feedback control of a current voltage-frequency operating point of a controlled circuit relative to a reference curve of a voltage-frequency operating domain associated with the controlled circuit, to bring the controlled circuit from a first operating point to a second operating point, said reference curve linking said first and second operating points with an optimum path relative to a boundary of said operating domain.

For example, an "optimum path" makes it possible at each point to maximize the performance (in terms of the number of operations per unit time) of the transitional operating point without violating the boundaries of the operating domain.

According to one definition of the reference curve, for a given voltage of the operating domain, the reference curve maximizes the frequency within said operating domain.

The circuit may further comprise:
 a first measuring module for measuring a current value of voltage applied to the controlled circuit, and
 a second measuring module for measuring a current value of frequency applied to the controlled circuit, The control module may furthermore be configured to determine a reference voltage value corresponding to said current value of frequency on said reference curve, and to update the voltage applied to the controlled circuit based on the determined reference voltage value.

The circuit may further comprise:
 a first measuring module for measuring a current value of the voltage applied to the controlled circuit, and
 a second measuring module for measuring a current value of the frequency applied to the controlled circuit, The control module may furthermore be configured to determine a reference frequency value corresponding to said current value of voltage on said reference curve, and to update the frequency applied to the controlled circuit based on the determined reference frequency value.

The control module may furthermore be configured for conjointly updating the voltage and the frequency that are applied to the controlled circuit.

The circuit may furthermore comprise at least one limiting module for limiting at least one of the variations in the voltage and in the frequency that are applied to the controlled circuit to prevent bringing the current operating point outside the voltage-frequency operating domain associated with the controlled circuit.

The circuit may furthermore comprise a correcting module for correcting at least one of the variations in the voltage and in the frequency that are applied to the controlled circuit to prevent bringing the current operating point outside the voltage-frequency operating domain associated with the controlled circuit.

For example, said correcting module is of Proportional-Integral-Derivative type.

The circuit may furthermore comprise a scaling module for scaling the signals for measuring voltage and frequency in order to compensate for a difference in response time to feedback control.

For example, the scaling module comprises a downsampler for downsampling at least one of the signals for measuring voltage and frequency.

The control module may furthermore be configured to adjust the operating point of the controlled circuit to bring the second operating point towards a final operating point.

The control module may furthermore be configured to adjust the frequency of the controlled circuit to bring the operating point closer to said boundary.

The control module may furthermore be configured to adjust the operating point to bring the controlled circuit from an initial operating point towards the first operating point.

The control module may furthermore be configured to adjust the voltage of the controlled circuit to bring the operating point away from said boundary.

The circuit may furthermore comprise a disconnection module configured for uncoupling the application of the frequency from the application of the voltage to the controlled circuit prior to said adjustments.

The control module may furthermore be configured to select said reference curve from among a set of stored reference curves on the basis of at least one operating parameter of the controlled circuit.

The control module may furthermore comprise a calibration module configured to define said reference curve on calibration.

The control module may furthermore comprise a calibration module configured to modify said reference curve on calibration.

For example, the modification is carried out in real time.

The control module may furthermore be configured to store said curve.

For example, the calibration is triggered on the basis of at least one operating parameter of the controlled circuit.

For example, said at least one parameter is a temperature of the controlled circuit.

For example, said at least one parameter is a timing fault rate of the controlled circuit.

For example, said at least one parameter reflects ageing of the controlled circuit.

The parameter may be determined based on the change in quantities that are characteristic of the circuit. For example, this may be a matter of analyzing the change in the oscillation frequency of an oscillator integrated into the circuit. Other parameters may be envisioned.

For example, the controlled circuit has a globally asynchronous locally synchronous architecture.

The objects according to the second, third and fourth aspects of the invention procure at least the same advantages as those procured by the method according to the first aspect. The device according to the third aspect may comprise means for the implementation of optional features referred to for the first aspect in terms of method.

BRIEF DESCIPTION OF THE DRAWING

Other features and advantages of the invention will appear on reading the present detailed description which follows, by way of non-limiting example, and of the appended drawings.

DETAILED DESCRIPTION

Before presenting a control circuit architecture for the implementation of embodiments of the invention, certain principle which may be implemented are presented with reference to FIGS. 1 to 4.

According to the invention, the control of an electronic circuit is performed so as to follow an optimum operating path of the circuit to pass from a first operating point (V1, F1) to a second operating point (V2, F2). The invention makes it possible to use the maximum capabilities of the circuit, in terms of frequency, even during the transitions.

Figure 1:
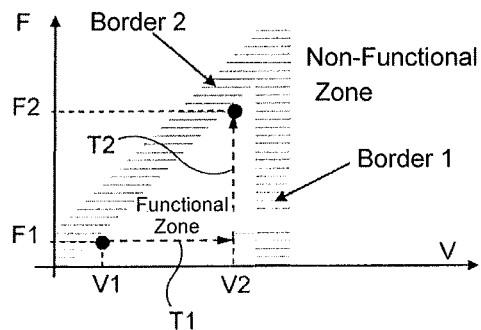
FIG. 1 illustrates a voltage-frequency operating domain by two orthogonal axes with the voltage V along the x-axis and the frequency along the y-axis in accordance with the prior art.
Figure 2:
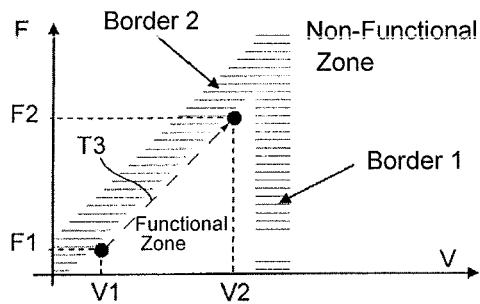
FIG. 2 illustrates an optimum path in accordance with an illustrative embodiment.

The feedback control of the voltage-frequency operating point (V, F) of the circuit relative to that optimum path is illustrated by FIG. 2, which uses the same notations as FIG. 1.

The path followed is represented by the arrow T3 and gets as close as possible to the boundary (Boundary 2) delimiting the maximum frequencies allowed for an operation of the circuit in the operating region. Ideally, the optimum path coincides with that boundary. However, in order to take into account definition errors in that boundary (on calibration of the circuit or to take into account uncertainties inherent in the production of the circuit components), a safety margin may be provided between that boundary and the optimum path.

Following the optimum path makes it possible to obtain maximum performance (in terms of the number of operation per unit time) of the circuit for the transitional phase for a minimum corresponding consumption, without the risk of timing faults.

This safety margin may depend on several parameters, in particular the temperature of the circuit, the ageing of the components, the slow variations in the supply voltage, the variability in the manufacturing process of the components, etc.

Thus, it is possible to provide several optimum curves according to these parameters.

These various optimum curves may for example be defined in phases of calibration or recalibration of the control circuit. This may make it possible to adapt to the phenomena referred to above.

Figure 3:
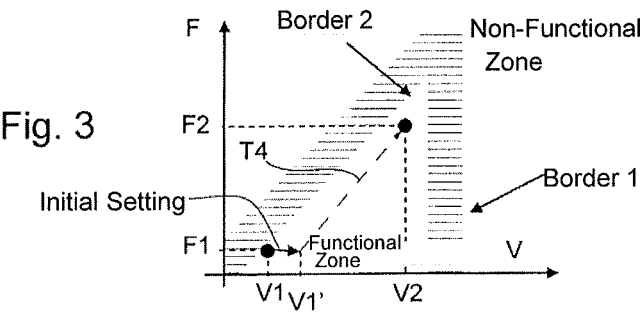
FIG. 3 illustrates an initial adjustment in accordance with an illustrative embodiment.

To avoid exceeding the boundaries of the operating domain (or operational region in FIG. 2) during feedback control, for example in critical operating phases of the circuit for which exceedance would be fatal, it may be provided to perform a preliminary step of inserting the safety margin as illustrated by FIG. 3 which repeats the notations of FIG. 2.

This preliminary step consists for example of bringing the operating point of the circuit from a current (or initial) operating point (V1, F1) to an operating point (V1', F1) of a reference curve T4 in order to go away from the boundary (Boundary 2). Next, the operating point of the circuit is feedback controlled between points (V1', F1) and (V2, F2).

This preliminary step may serve to allow a safety margin relative to the boundary of the operating domain. It may also serve to take a position on a chosen reference curve on the basis of operating parameters of the circuit such as temperature, ageing, etc.

Figure 4:
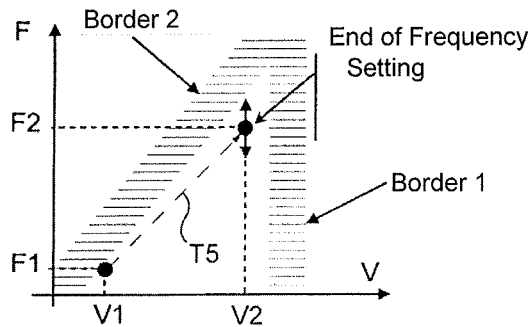
FIG. 4 illustrates a final adjustment in accordance with an illustrative embodiment.

In order to bring the circuit towards an operating point that is the most optimal or to move that operating point away from the boundary, a final step of fine adjustment of the operating point may be provided, as illustrated by FIG. 4 which uses the notations of FIG. 2. This final step is implemented after the feedback control of the operating point between the points (V1, F1) and (V2, F2).

This final step for example consists of bringing the circuit from an extreme point (V2, F2) of a reference curve T5 towards a final operating point by finely increasing or reducing the frequency to get towards a final operating point which is, according to choice, closer to the boundary or slightly further away therefrom.

Generally, during the feedback control of the operating point or initial and final adjustments, the voltage control may be disconnected from the frequency control in order to be able to move away somewhat from the reference curve if necessary. In this case, the control circuit implementing the feedback control uncouples the voltage control from that of the frequency, until the desired operating point is reached. The control may then be carried out according to known techniques for example in accordance with the document of Beigne et al. "*An Innovative Local Adaptive Voltage Scaling Architecture for On-chip Variability Compensation*" NEW-CAS 2011, 26-29 Jun. 2011, Bordeaux, France.

After having presented a few general principles able to be employed to implement the invention, a circuit architecture is presented below.

Figure 5:
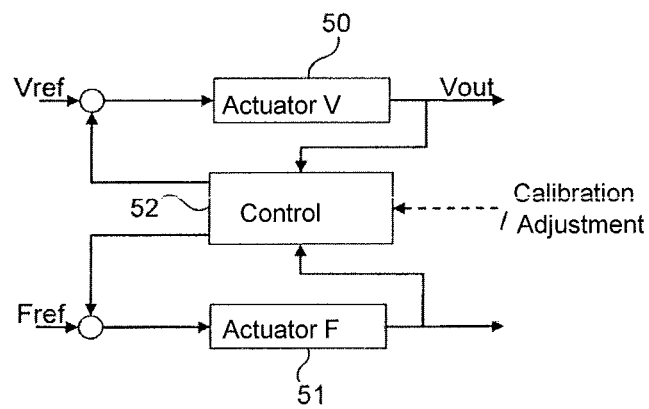
FIG. 5 illustrates a general circuit layout according to some embodiments.

First of all, a control circuit general layout for implementing feedback control of the operating point according to the invention is represented in FIG. 5.

The circuit comprises a voltage actuator 50 and a frequency actuator 51 to respectively apply a voltage $V_{OUT}$ and a frequency $F_{OUT}$ to the controlled, or commanded, electronic circuit (not shown).

These actuators respectively take a reference voltage $V_{ref}$ and a reference frequency $F_{ref}$ as input, which may be corrected by a control module 52. This control module may act on one or other of the actuators or on both at the same time (conjoint control, or coupling), via for example modification of the reference quantities. Thus, the module 52 may have two respective outputs to each of the actuators as represented in FIG. 5 or else have only one output to one of those actuators (this variant is presented at the end of the description with reference to FIGS. 14 and 15).

As inputs the control module receives the output voltage from the voltage actuator and the output frequency from the frequency actuator. It may also receive other parameters concerning the calibration (definition of the reference curves, triggering of such calibration, etc.), the adjustment of the operating point of the circuit, the disconnection of the control circuit relative to the controlled circuit during the control and/or the calibration, or other parameters.

The respective dynamics of the actuators, that is to say in particular their respective response times, may be different (the system is then referred to as being multiscale). They may both be governed by continuous-time or discrete-time internal control laws. Where on actuator is a "continuous-time" actuator and the other a "discrete-time" actuator, this is referred to as a hybrid system.

Figure 6:
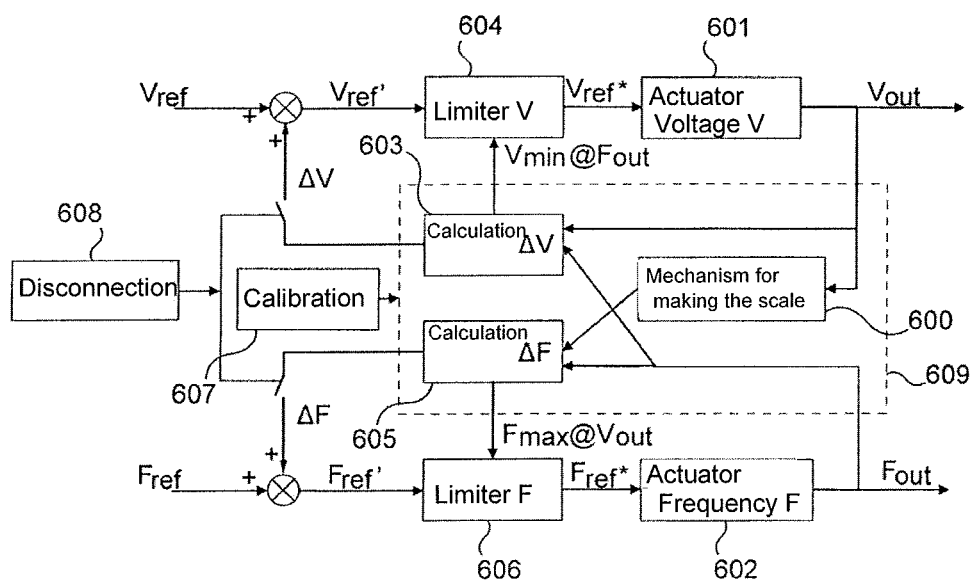
FIG. 6 illustrates a circuit architecture according to the layout of FIG. 5.

FIG. 6 illustrates a control circuit architecture which reproduces the layout of FIG. 5.

This circuit may comprise a scaling module 600. This block may make it possible to compensate for the different dynamics of the two actuators, of voltage and of frequency 601 and 602, when one actuator responds with a very short transition relative to the transition of the other actuator. In the example of FIG. 6, it is considered that the voltage actuator has a very fast dynamic relative to the dynamic of the frequency actuator. Thus, this module downsamples the voltage actuator output. However, downsampling, or any other compensation mechanism, could be applied to the frequency actuator.

An example of use of such a scaling module is a context in which one of the actuators is continuous (for example a DC-DC variator for the voltage actuator) and the other is discrete, i.e. sampled (for example a DFLL, which stands for "*Digital Frequency Locked-Loop*" as in the document by Lesecq et al., *Low-Cost and Robust Control of a DFLL for Multi-Processor System-On-Chip*, IFAC World Congress, 2011. The scaling mechanism serves in this case to sample the continuous actuator output to make it discrete. The implementation of the control may then be fully discrete (that is to say sampled) thanks to the scaling block, so enabling a purely digital implementation of command.

A voltage control block 603 makes it possible to perform feedback control of the voltage according to the reference voltage. As input this block receives the voltage output from the voltage actuator (possibly scaled) and the output frequency from the frequency actuator (possibly scaled), and computes two outputs.

A first output is a signal which represents a voltage variation ($\Delta V$) to apply to the reference signal ($V_{ref}$) to adapt the instruction given to the voltage actuator to that given to the frequency actuator. This signal ($\Delta V$) is generated from the current outputs of the two actuators ($V_{OUT}$ or $F_{OUT}$) and from the reference curve to follow. It is a matter of computing the value $\Delta V$ as the voltage Vi that the voltage actuator should output according to the reference curve for the measured current output frequency ($F_{OUT}$), less the current output voltage $V_{OUT}$.

The computation of the voltage Vi used to obtain $\Delta V$ is described below with reference to FIG. 7 which re-uses the notations of FIG. 2 and FIG. 8.

Figure 7:
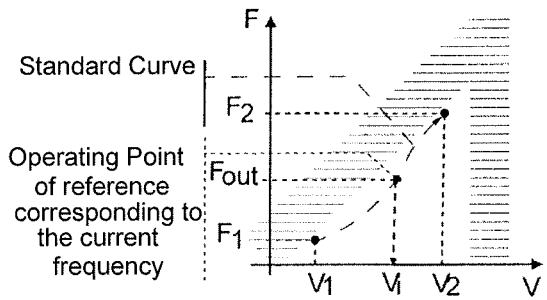
FIGS. 7 to 11 illustrate computations carried out during the feedback control in accordance with an illustrative embodiment.

FIG. 7 illustrates the choice of the value Vi which corresponds to the current frequency value on the reference curve of the circuit.

FIG. 7 illustrates the choice of the value Vi which corresponds to the current frequency value on the reference curve of the circuit.

Figure 8:
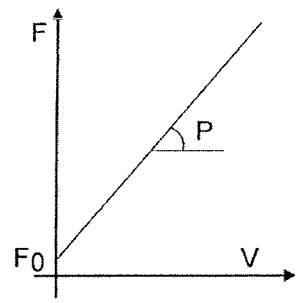

As illustrated by FIG. 7, the reference curve may have a shape which is more or less complex; however, in the interest of clarity of the disclosure, this curve is simplified in FIG. 8 in which it is presented by a straight line.

In this case, the values Pi and $F_0$ are two constants which define the straight line, $P_i=1/P$ being the inverse of the slope P of the straight line and $F_0$ being the value of frequency when the straight line intersects the y-axis.

For a measured output frequency value $F_{OUT}$, the corresponding value of voltage Vi according to the curve of FIG. 8, is;

$$V_i = P_i(F_{out} - F_0) \tag{1}$$

The value of $\Delta V$ is the difference between Vi and $V_{OUT}$ as follows:

$$\Delta V = V_i - V_{out} = P_i(F_{out} - F_0) - V_{out} \tag{2}$$

The generated signal $\Delta V$ is added to the reference voltage $V_{ref}$ in order to modify the latter, which then becomes the new reference $V_{ref}'$:

$$V_{ref}' = V_{ref} + \Delta V \tag{3}$$

Returning to FIG. 6, the second output from block 603 corresponds to the lower bound for voltage $V_{min}$ for a measured output frequency $F_{OUT}$ (this bound is designated by "$V_{min}@F_{out}$" in FIG. 6). This value represents the minimum voltage which can be applied to the voltage actuator without leaving the operating domain of the circuit delimited by the boundaries. It is calculated as follows:

$$V_{min}=P_{i,sat}(F_{out}-F_{0,sat}) \quad (4)$$

where $P_{i,sat}$ and $F_{0,sat}$ are two constants which define the bound straight line, i.e. a curve VFsat not to be exceeded. In a simple case, this curve may coincide with the reference curve, i.e.:

$$P_{i,sat}=P_i$$

$$F_{0,sat}=F_0 \quad (5)$$

In other cases, the bound straight line (or curve) coincides with the boundary of the operating domain. It is also possible to envision a bound curve which takes into account parameters of the circuit to leave a safety margin with the boundary.

The bound value is supplied to a voltage limiter block 604 which also receives the instruction value $V_{ref}'$ as input. This block applies saturations to the reference voltage $V_{ref}'$ to obtain $V_{ref}*$.

Figure 9:
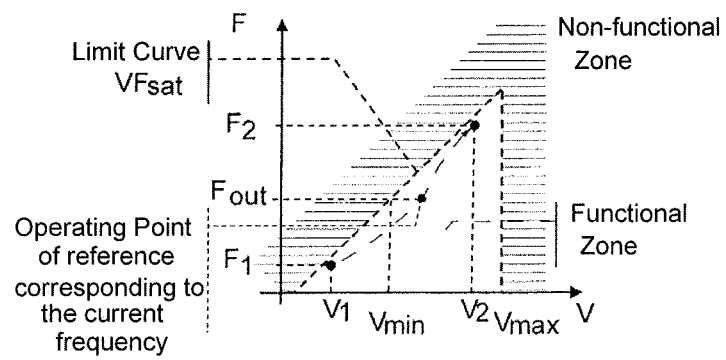

The input $V_{ref}'$ is limited to remain between values $V_{max}$ and $V_{min}$. The maximum voltage value ($V_{max}$) depends on the technology and it is not represented in the layout of FIG. 6. The value $V_{min}$ corresponds to the minimum operational voltage for the measured frequency $F_{OUT}$. It ensures that the reference voltage (Vref*) applied to the voltage actuator does not cause the system to enter into the non-operational region (that is to say outside the operating domain) as represented in FIG. 9.

Returning to FIG. 6, a frequency control block 605 makes it possible to perform feedback control in accordance with the reference curve. As input this block receives the voltage output from the voltage actuator (possibly scaled) and the output frequency from the frequency actuator (possibly scaled), and computes two outputs.

Figure 10:
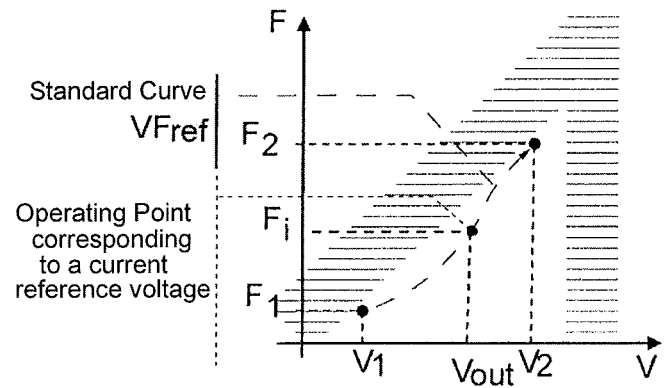

The first output corresponds to a frequency variation signal (ΔF) to apply to the reference signal ($F_{ref}$) to adapt the behavior of the frequency actuator to that of the voltage actuator. This signal (ΔF) is generated from the current output of the two actuators ($V_{OUT}$, $F_{OUT}$) and from the reference curve to follow. It is a matter of computing the value ΔF as the frequency Fi that the frequency actuator should supply according to the reference curve for the measured current output voltage ($V_{OUT}$), less the output frequency $F_{OUT}$. The value Fi used to obtain ΔF is illustrated by FIG. 10.

Resuming the model described with reference to FIG. 8, the reference curve VFref is a straight line described by:

$$F_i=F_0+P\cdot V^{out} \quad (6)$$

The value ΔF is calculated as the difference between Fi and $F_{OUT}$ as follows:

$$\Delta F=F_i-F_{out}=F_0+P\cdot V_{out}-F_{out} \quad (7)$$

The second output from the frequency control block corresponds to the upper bound for frequency $F_{max}$ for a measured output voltage $V_{OUT}$ (designated by "$F_{max}@V_{out}$" in FIG. 6). This value represents the maximum frequency which can be applied to the frequency actuator without leaving the operating domain of the circuit (operational region). It is calculated as follows:

$$F_{max}=F_{0,sat}+P_{sat}\cdot V_{out} \quad (8)$$

where $P_{sat}$ and $F_{0,sat}$ are two constants which define the straight line (curve) bound VFsat not to be exceeded. In a simple case, this curve may be equal to the reference curve VFref, i.e.:

$$P_{sat}=P$$

$$F_{0,sat}=F_0 \quad (9)$$

In other cases, the bound straight line (or curve) coincides with the boundary of the operating domain. It is also possible to envision a bound curve which takes into account parameters of the circuit to leave a safety margin with the boundary.

The bound value is supplied to a frequency limiter block 606 which also receives the instruction value $F_{ref}'$ as input. This block applies bounds to the reference frequency $F_{ref}'$ to obtain $F_{ref}*$.

Figure 11:
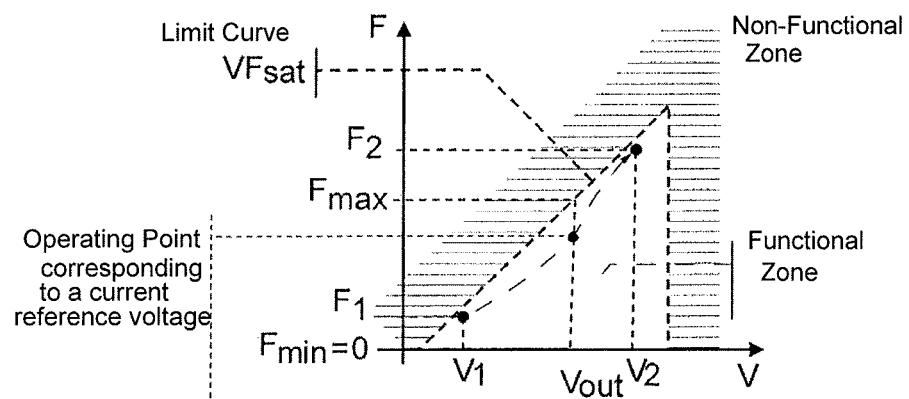

The input $F_{ref}'$ is bounded to remain between $F_{max}$ and $F_{min}$. The minimum frequency value ($F_{min}$) depends on the actuator present in the system. It may be considered as equal to zero ($F_{min}=0$) and is not represented in FIG. 6. The value $F_{max}$ corresponds to the maximum operational frequency for the measured voltage $V_{OUT}$. Beyond this bound, the controlled circuit (logic system) may produce timing (or logic faults). It ensures that the frequency reference ($F_{ref}*$) applied to the frequency actuator will not lead to moving the system outside the operating domain as illustrated in FIG. 11.

Returning to FIG. 6, a calibration block 607 makes it possible to choose/modify the reference curve that must be followed in the plane V-F in order to ensure an optimum operating point (i.e. maximum performance, for a minimum power consumption) throughout the transition from one operating point (F1,V1) to another (F2,V2) and vice-versa.

Modifying the reference curve (for example the pair (P, F0) in the case of a straight line) makes it possible to adapt in particular to the variability in the manufacturing process, to slow variations in the supply voltage or to variations in the temperature of the circuit.

For example, a measurement of the temperature T of the circuit makes it possible to decide to activate the calibration mechanism. Depending on the temperature noted, the reference curve is modified. The different reference curves are for example placed in memory in a LUT (standing for "Look-up table").

The calibration mechanism may enable the reference curve to be modified in course of operation in order to have a safety margin relative to the boundary.

The calibration module may furthermore contain a function which automatically launches the identification of the reference curve and the parameters for the scaling. This triggering may be driven by external information, for example the temperature, the number of timing faults of the controlled circuit or other information. Such driving may be implemented in accordance with the document by Rebaud et al., "*Timing slack monitoring under process and environmental variations: Application to a DSP performance optimization*", Microelectronics Journal 2011).

As concerns the calibration mechanism as such, the skilled person may refer to known mechanisms which are not part of the present description.

A disconnection module 608 makes it possible to uncouple the voltage control from the frequency control, for example to enable adjustment of the frequency and/or of the voltage, when the system is sufficiently close to the desired operating point (cf. final adjustment referred to above). When the disconnection is implemented, each actuator has an independent behavior. Certain liberties may then be taken relative to the reference curve to choose the final operating point. The voltage and frequency are modified in an appropriate order in order to avoid timing faults as in a conventional AVFS system (AVFS standing for "Adaptive Voltage and Frequency Scaling").

The disconnection may also make it possible to return to a conventional DVFS control scheme, subject to ensuring an appropriate order of modification of the voltage and of the frequency in order to avoid timing faults.

It may be noted that the assembly 609 formed by modules 600, 603 and 605 can form a control module as referred to with reference to FIG. 5.

The control as referred to above may be implemented digitally with a hardware device controlled by a computer program.

Nevertheless, the control may be envisioned in an analog context.

In such contexts, the control may be sensitive to temperature variations. To be precise, the different components employed to implement the control could be temperature-sensitive. The calibration block 607 described with reference to FIG. 6 may then be configured to adjust the reference curve in order for the applied control to be that which is desired.

The temperature may modify the behavior of the voltage and frequency actuators, and in particular their dynamic. The calibration block may be used to compensate for this dynamic difference, by adjusting the scaling mechanism.

After having presented a circuit architecture, the voltage-frequency control is dealt with from an automatic point of view. Simulation results are then presented.

Generally, when the voltage and the frequency are conjointly controlled, it is possible to perform autonomous management that is stable (as understood in control theory) of the two signals, of voltage and frequency. The management is autonomous in that the system changes from one operating point to another operating point, by following the desired reference curve, and by changing the values of the voltage and frequency references.

The conjoint control may rely on the theory of control by consensus as summarized for example in the document by Olfati-Saber et al., "*Consensus and Cooperation in Networked Multi-Agent Systems*", Proceedings of the IEEE, Vol. 95:1, pp. 215-233, January 2007.

According to this theory, systems with control by consensus are represented by agents having the dynamic $$\dot{x}_i = u_i, i=1:n$$

in a network. The objective is to attain a consensus via local communications with the neighbors on a graph. "Attain a consensus" means that each agent asymptotically converges towards a common point, i.e. $x_1 = x_2 = \ldots = x_n$. In practice, most works of the literature consider that the consensus at equilibrium is a constant or a weighted average of the initial conditions.

According to works of the literature, the agents may have dynamic models.

In fact, the problem considered here is more general since the agents must following a desired reference. Furthermore their dynamic model is not a simple integrator. Thus, the results provided by the document by Fax et al., "*Information Flow and Cooperative Control of Vehicle Formations*", IEEE Transactions on Automatic Control, Vol. 49:9, Sep. 2004 may be used.

Where the actuators have dynamics of different nature, a variable change must be carried out (which in practice is made in the calculations of $\Delta V$ and $\Delta F$). Thus, each system (frequency actuator or voltage actuator) may be modeled by $$\dot{x}_i = P_A x_i + P_B u_i$$

$$y_i = P_{C_1} x_i$$

$$z_{ij} = P_{C_2}(x_i - x_j) \; i \neq j$$

with i=1 or i=2. The consensus is said to be achievable asymptotically, according to the document by Wang et al., "*Consensus of High Order Linear Multi-agent Systems Using Output Error Feedback*", Joint 48th IEEE Conference on Decision and Control and 28th Chinese Control Conference Shanghai, P. R. China, 16-18 Dec. 2009, if $$\lim_{t \to \infty} \|x_1 - x_2\| = 0$$

(definition 3 of the aforementioned document, adapted to two agents).

A retroaction is then constructed, on the error between states $x_i$, as in the document by Wang et al., "*Consensus Of Multi-Agent Linear Dynamic Systems*", Asian Journal of Control, Vol. 10:2, pp. 144-155, March 2008 (which de facto amounts to control by "state error" feedback, and not by "state" feedback as is conventionally the case):

$$u_i = K(x_i - x_j) \text{ (here again adapted to two agents)}.$$

The interconnection matrix of the agents is then defined according to $$L_G = \begin{bmatrix} 1 & -1 \\ -1 & 1 \end{bmatrix}.$$

Given the particular properties (eigenvalues respectively equal to 0 and 2) and the fact that the interconnection graph is complete (i.e. each agent/system is connected to the other), the stabilization of the overall system in practice amounts to stabilizing one of the systems referred to in the aforementioned document by Fax et al. by error feedback $u_i = K(x_i - x_j)$, K<0.

This is the solution which applies, given the applied correction (that is to say the particular control applied), cf. equations (2) or (7) and FIG. 6. The reference values and the offset $F_0$ introduced previously do not change the reasoning as to the stability of the system with control by consensus (in the literature, the offset is termed "bias").

Furthermore, it is possible to adjust the dynamic (which has a direct link with the rapidity with which the error between the reference and the output obtained tends towards zero) by acting on the coefficient K.

The study conducted here with the control by consensus approach, given the system considered, may be reduced to a simple study of a multivariable system controlled "by error state feedback" (and not by state feedback as is conventionally the case). The controller must then be adjusted (by state feedback) in order to ensure the stability (and robustness) of the controlled multivariable system. The stability of the looped multivariable system is ensured by the position of the poles of the looped system.

Lastly, the stability study may be conducted on the basis of the theory by Lyapunov presented in the document H. Khalil, "*Non-linear Systems*" Prentice Hall, 2002.

Figure 12:
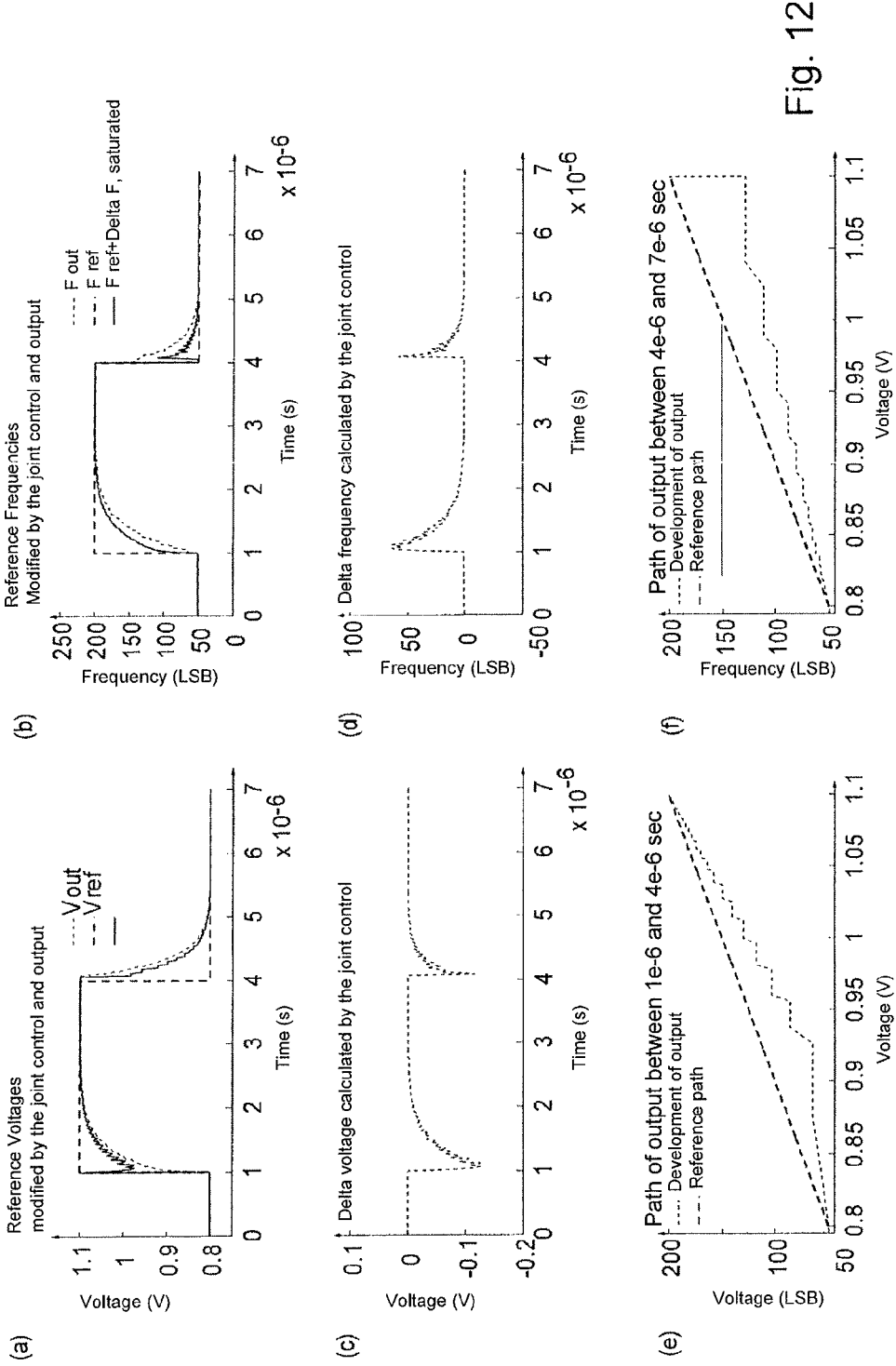
FIG. 12 illustrates simulation results in accordance with an illustrative embodiment.

FIG. 12 presents results of simulation in a MATLAB®/Simulink®, environment, of a system comprising:
  a voltage actuator made with a $V_{dd}$-hopping system according to the document by Albea-Sanchez et al., "*Control and Stability Analysis for the Vdd-hopping Mechanism*", IEEE MSC, Conference on Control and Applications, 2009, and
  a frequency actuator made with a frequency-locked-loop according to the document by Lesecq et al., "*Low-Cost and Robust Control of a DFLL for Multi-Processor System-On-Chip*", 18th IFAC World Congress, 28 Aug.-2 Sep. 2011.

The conjoint control as presented above is implemented. The reference curve is illustrated in the voltage-frequency graphs (e) and (f). The other graphs of FIG. 12 show in a general manner the change in the signals applied to the voltage and frequency actuators and the outputs $V_{OUT}$ and $F_{out}$.

Contrary to the conventional DVFS approaches, the voltage V and the frequency F change conjointly, and not one after the other, without exceeding the reference curve.

After having presented the simulation results, variant embodiments are presented.

The present invention may apply to any type of voltage V actuator and frequency F actuator in a voltage-frequency operating domain in the context of the reduction in the power consumed without performance loss.

Several situations involve a (re-)calibration of the reference curve or of the scaling mechanism may be considered.

Thus, as referred to above, the decision for recalibration of the curve by be taken based on a temperature measurement, the detection of a timing defect, etc.

An external procedure may also launch the recalibration phase, for example when the expected behavior is not found, or in case of ageing of the hardware.

Figure 13:
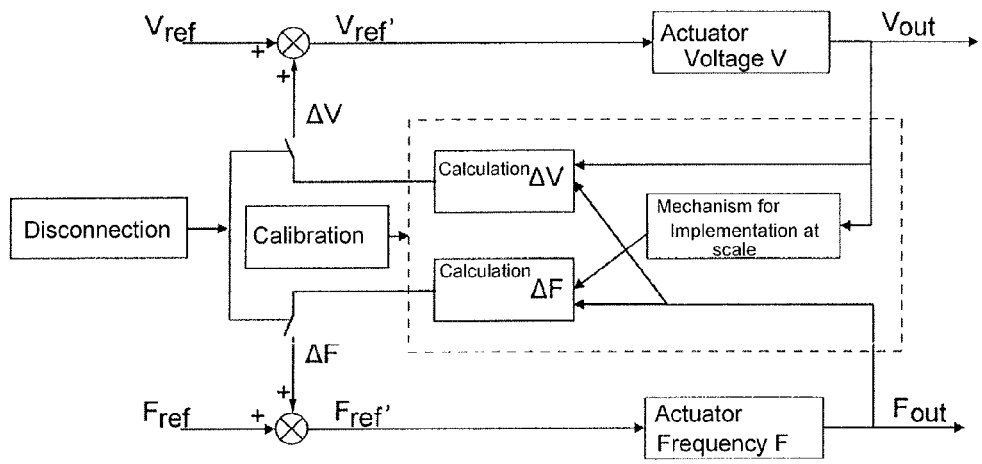
FIGS. 13 to 16 illustrate architecture variants in accordance with an illustrative embodiment.

In an embodiment of the invention represented in FIG. 13, the limitation blocks 604 and 605 of FIG. 6 are omitted. This type of solution may be implemented in applications for which exceedances (of the reference curve) may be tolerated.

According to other example embodiments, a single control branch is implemented. There is thus no conjoint control.

Figure 14:
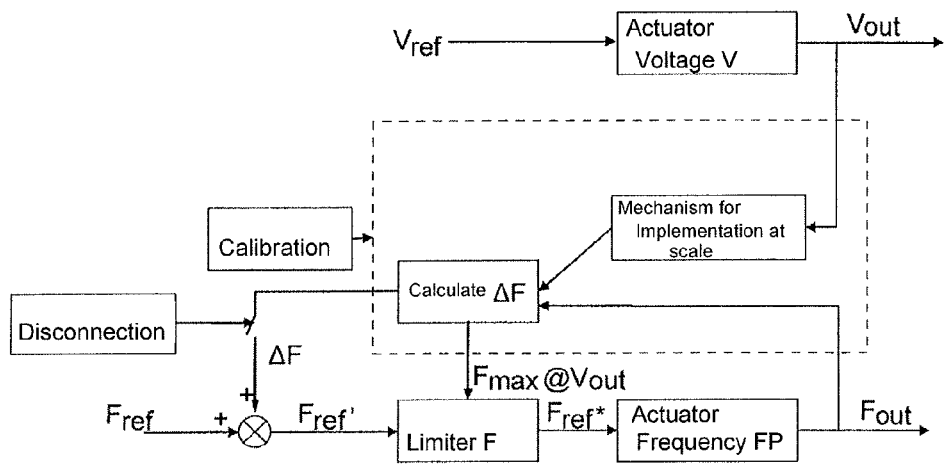

FIG. 14 represents the example of a single control on the frequency actuator for feedback control of the operating point of the controlled circuit on the reference curve.

From the point of view of the theory of control by consensus, this is expressed by a directional connection graph.

Figure 15:
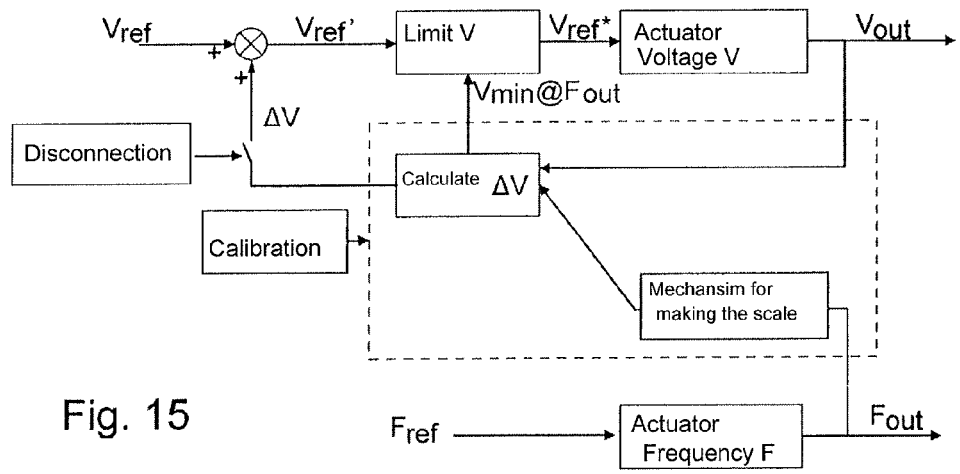

FIG. 15 represents the example of a single control on the voltage actuator for feedback control of the operating point of the controlled circuit on the reference curve.

Figure 16:
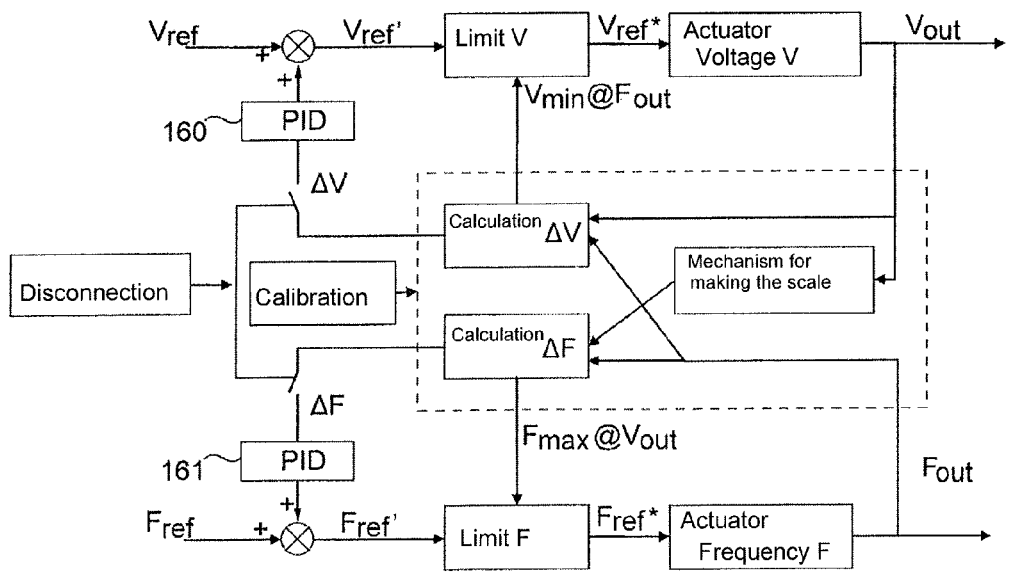

In another variant of the invention, the output signal from the voltage and frequency control blocks 603 and 605 (relative to the calculation of ΔV and ΔF), may be connected to a corrector (or controller) filter of conventional PID type (PID being an acronym for "Proportional-Integral-Derivative"). This variant is represented in FIG. 16. Blocks 160 and 161 are corrector filters for the variations ΔV and ΔF respectively. The advantage of this implementation is a possible improvement in the dynamic of following the path by the PID filters.

Here too, the adjustment of the filter may be dealt with via the multivariable control and the coupling matrix as defined above.

Of course, combinations of the variants referred to above are possible. For example, the single control may be made without limiter and with a PID corrector (or controller). A conjoint control may be made without limiter and with correctors. It is possible to use only one limiter and/or only one corrector. All the other combinations are possible.

Figure 17:
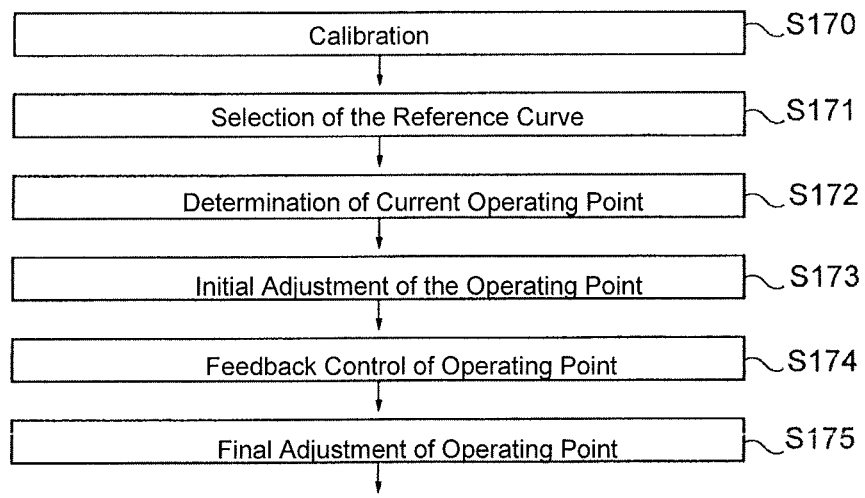
FIG. 17 is a flow chart of steps implemented in a method according to one embodiment.

FIG. 17 is a general flow chart of steps implemented in a control method according to one embodiment.

At a first step S170 a calibration is performed to define and/or modify the reference curve of the controlled circuit.

The reference curve to use is then selected at the step S171, for example based on parameters such as the temperature, ageing, or other parameter.

The current operating point is then determined by measuring the current frequency and voltage at step S172.

To bring the circuit from the current operating point to the desired operating point, a step of initial adjustment S173 is implemented, as explained above. The feedback control is then implemented at step S174 to keep the operating point on an optimum path as already explained.

Lastly, a step S175 of final adjustment of the operating point is carried out to bring the circuit towards the desired operating point.

A computer program for the implementation of a method according to one embodiment of the invention may be produced on reading the flow chart of FIG. 17 and the present detailed description.

Figure 18:
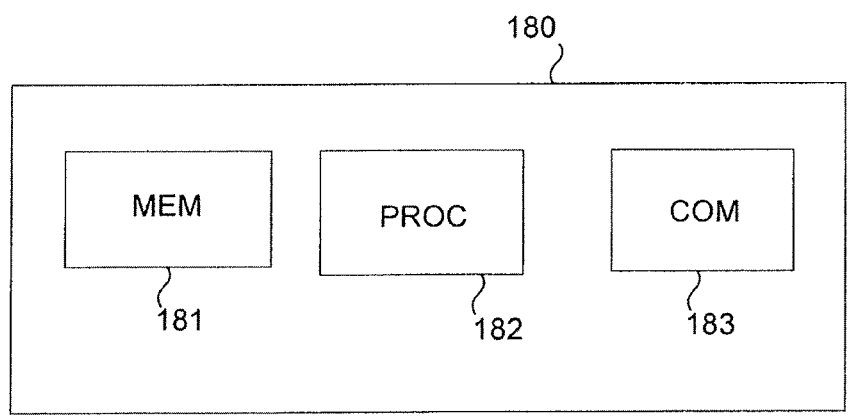
FIG. 18 is a diagrammatic illustration of a device according to an embodiment of the invention.

To control the implementation of the method, in particular to control the various modules of the control circuit, a control module represented diagrammatically in FIG. 18 may be used.

The control module 180 of FIG. 18 comprises a memory unit 181 (MEM). This memory unit comprises a random access memory for temporary storage of the computation data used during the implementation of a method according to the invention, according to various embodiments. The memory unit furthermore comprises a non-volatile memory (for example of EEPROM type) for example for storing a computer program according to an embodiment for its execution by a processor (not represented) of a processing unit 182 (PROC). For example, the memory unit stores the various reference curves in a table ("Look-up table"). The control module further comprises a communication unit 183 (COM) to implement communications in particular to send control signals to the various modules of the control circuit.

Of course, the present invention is not limited to the described embodiments, other variants and combinations of features are possible.

The present invention has been described and illustrated in the present detailed description with reference to the appended FIGS. However the present invention is not limited to the embodiments presented. Other variants and embodiments may be deduced and implemented by the person skilled in the art on reading the present description and appended FIGS.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

The invention claimed is:
1. A method of controlling an electronic circuit, to bring the electronic circuit from a first operating point to a second operating point, each operating point being defined by a voltage and a frequency respectively obtained by a voltage actuator and a frequency actuator each having a control input, the method comprising feedback control of a current voltage-frequency operating point relative to a reference curve of a voltage-frequency operating domain associated with the electronic circuit, the reference curve linking the first and second operating points within the voltage frequency operating domain and corresponding to an optimum path getting as close as possible to a boundary of the voltage-frequency operating domain representing a maximum authorized frequency for each voltage value allowable by the electronic circuit, the feedback control comprising repeating the following steps a plurality of times during the operating point shift from the first operating point to the second operating point following the reference curve;
a) measuring a current value of a voltage and a current value of a frequency applied to the circuit and corresponding to the current voltage-frequency operating point;
b) determining at least one new control value to apply to the control input of at least one of the voltage and frequency actuators, the new control value being defined based on the voltage and frequency values of the current voltage-frequency operating point and based on the reference curve in such a way to ensure an operating point shift close to the reference curve; and
c) applying the at least one new control value at least one actuator.

2. The method according to claim 1 further comprising, during step b), the steps of:
determining an operating point of reference on the reference curve, with a voltage value corresponding to the current value of frequency; and
determining a new control value to apply to the control input of the voltage actuator based on this operating point of reference in order to update the voltage applied to the circuit so that the voltage and the frequency that are applied to the circuit follow the reference curve.

3. The method according to claim 2 further comprising, during step b) of conjointly updating the control input of the voltage and frequency actuators, so that the voltage and the frequency that are applied to the circuit follow the reference curve.

4. The method according to claim 1 further comprising, during step b) the steps of:
determining an operating point of reference on the reference curve, with a frequency value corresponding to a current value of voltage; and
determining a new control value to apply to the control input of the frequency actuator based on this operating point of reference in order to update the frequency applied to the circuit so that the voltage and the frequency that are applied to the circuit follow the reference curve.

5. The method according to claim 1, further comprising, during step b) a limitation control operation of the at least one new control value to apply to the control input of at least one of the voltage and frequency actuators, in order to limit at least one of the variation in the voltage and in the frequency that are applied to the circuit to prevent bringing the current voltage-frequency operating point outside the voltage-frequency operating domain associated with the circuit.

6. The method according to claim 1 further comprising scaling signals for measuring voltage and frequency in order to compensate for a difference in response time at the feedback control step.

7. The method according to claim 1 further comprising applying a final adjustment of the current voltage-frequency operating point of the circuit to bring the second operating point towards a final operating point, so as to bring the current voltage-frequency operating point of the circuit towards the boundary.

8. The method according to claim 7 further comprising uncoupling the application of a frequency from the application of a voltage to the circuit prior to applying the final adjustment.

9. The method according to claim 1 further comprising applying an initial adjustment of the current voltage-frequency operating point of the circuit to bring an initial current voltage-frequency operating point towards the first operating point, so as to bring the current voltage-frequency operating point of the circuit away from the boundary.

10. The method according to claim 9 further comprising uncoupling the application of a frequency from the application of a voltage to the circuit prior to applying the final adjustment.

11. The method according to claim 1 further comprising selecting the reference curve from among a set of stored reference curves on the basis of at least one operating parameter of the circuit.

12. The method according to claim 11, wherein the at least one parameter comprises one of a temperature of the circuit, a timing fault rate of the circuit, or a parameter reflecting ageing of the circuit.

13. The method according to claim 1 further comprising calibrating to define or modify the reference curve.

14. The method according to claim 13, wherein calibrating is triggered on the basis of at least one operating parameter of the circuit.

15. The method according to claim 14, wherein the at least one parameter comprises one of a temperature of the circuit, a timing fault rate of the circuit, or a parameter reflecting ageing of the circuit.

16. An electronic circuit control device comprising a processing unit configured to implement the method according to claim 1.

* * * * *